US008718936B2

(12) United States Patent
Fountain

(10) Patent No.: US 8,718,936 B2
(45) Date of Patent: May 6, 2014

(54) NAVIGATION DEVICE

(75) Inventor: Jonathan William Fountain, Nottingham (GB)

(73) Assignee: J & M Inertial Navigation Limited, Chelmorton, Derbyshire (GB)

( * ) Notice: Subject to any disclaimer, the term of this patent is extended or adjusted under 35 U.S.C. 154(b) by 452 days.

(21) Appl. No.: 12/799,191

(22) Filed: Apr. 20, 2010

(65) Prior Publication Data
US 2010/0268454 A1 Oct. 21, 2010

(30) Foreign Application Priority Data

Apr. 20, 2009 (GB) .................................. 0906764.6

(51) Int. Cl.
G01C 21/16 (2006.01)
(52) U.S. Cl.
USPC .......................................... 701/472; 701/500
(58) Field of Classification Search
USPC .......... 701/472, 500–502, 504, 505, 527, 541
See application file for complete search history.

(56) References Cited

U.S. PATENT DOCUMENTS

| 5,303,206 | A * | 4/1994 | Bemb et al. ................. 367/127 |
| 6,697,758 | B2 * | 2/2004 | McCall et al. ............... 702/141 |
| 6,801,855 | B1 * | 10/2004 | Walters et al. ............... 701/410 |
| 6,807,127 | B2 * | 10/2004 | McGeever, Jr. ............. 367/128 |
| 7,487,043 | B2 * | 2/2009 | Adams ......................... 701/300 |
| 8,027,785 | B2 * | 9/2011 | Adams ......................... 701/428 |
| 8,315,560 | B2 * | 11/2012 | Rhodes et al. ............... 455/40 |
| 2003/0135327 | A1 * | 7/2003 | Levine et al. ................ 701/220 |
| 2004/0215388 | A1 * | 10/2004 | Takenaka ..................... 701/209 |
| 2006/0047428 | A1 * | 3/2006 | Adams ......................... 701/300 |
| 2006/0224352 | A1 * | 10/2006 | Baer et al. .................... 702/150 |
| 2006/0247849 | A1 * | 11/2006 | Mohsini et al. .............. 701/206 |
| 2007/0006472 | A1 * | 1/2007 | Bauch .......................... 33/355 R |
| 2007/0168126 | A1 * | 7/2007 | Wence et al. ................ 701/220 |
| 2008/0077326 | A1 * | 3/2008 | Funk et al. ................... 701/220 |
| 2008/0105050 | A1 * | 5/2008 | Kraetz ........................... 73/496 |
| 2010/0121567 | A1 * | 5/2010 | Mendelson ................... 701/206 |

FOREIGN PATENT DOCUMENTS

| DE | 10 2004 050292 | 4/2006 |
| JP | 8138200 | 5/1996 |

OTHER PUBLICATIONS

Bernstein, J.; An Overview of MEMS Inertial Sensing Technology; Feb. 1, 2003; http://www.sensormag.com/sensors/acceleration-vibration (Accessed Mar. 8, 2010).

(Continued)

Primary Examiner — Jason Holloway
(74) Attorney, Agent, or Firm — James Creighton Wray

(57) ABSTRACT

Apparatus for, and a method of, providing output data to a person identifying a route back to a recorded waypoint position. Personal navigation apparatus for providing output data to a person identifying a route back to a recorded waypoint position, comprising a route indication device including a visual display element; and a positioning device. The positioning system includes a processing system having a data storage device, a first micromechanical device configured to produce an output signal proportional to an acceleration along an axis, and a second micromechanical device having components in constant motion and configured to produce an output signal proportional to its angular rate of motion around an axis. The processing system is configured to generate and store in said data storage device position data describing the position of said personal navigation apparatus within a reference space, based upon data received from said first micromechanical device and said second micromechanical device.

18 Claims, 14 Drawing Sheets

(56) References Cited

OTHER PUBLICATIONS (Anon.), Analog Devices, Inc.; *MEMS Inertial Sensors*; 2010; http://www.analog.com/en/technical-library (Accessed Mar. 8, 2010).

Stovall, Sherryl H.; *Basic Inertial Navigation*; Naval Air Warfare Center Weapons Division, China Lake, CA, 93555-6100; Report # NAWCWPNS TM 8128, Sep. 1997.

(Anon.); *Principle of Operation of an Accelerometer*; Chapter 2, Unknown publications; pp. 7-11.

Geen et al.; *New IMEMS Angular-Rate-Sensing Gyroscope*; Analog Dialogue 37-03 (2003); pp. 1-4.

Barbour et al.; *Inertial Instruments: Where to now?*; AIAA-92-4414-CP; The Charles Stark Draper Laboratory, Inc., Cambridge, MA 02139; pp. 566-574.

Wikipedia, the free encyclopedia; *Inertial Navigation system*; (11 pages); *Gyroscope*; (8 pages); and *Vibrating Structure Gyroscope*; (4 pages). Accessed May 3, 2010.

\* cited by examiner

US 8,718,936 B2

NAVIGATION DEVICE

CROSS REFERENCE TO RELATED APPLICATIONS

This application claims priority from United Kingdom Patent Application No. 09 06 764.6, filed 20 Apr. 2009, the whole contents of which are incorporated herein by reference in their entirety.

BACKGROUND OF THE INVENTION

1. Field of the Invention

The present invention relates to a navigation device, in particular personal navigation apparatus for providing output data to a person identifying a route back to a recorded waypoint position, and a method of providing output data to a person identifying a route back to a recorded waypoint position.

2. Description of the Related Art

A person during a journey may experience an event that impairs the ability of that person to locate a safe position away from the position at which the event occurred. For example, a person may be diving in extreme conditions and may become disoriented and require guiding away from the event position.

Navigational systems are known. The two main techniques of navigation currently open to divers are dead reckoning, which involves following a compass bearing whilst simultaneously keeping track of distance and time, and pilotage, a combination of an underwater chart and clearly identifiable terrain features such as a reef. However, known navigational systems are impractical for a single person to transport conveniently. In addition, some navigational systems do not operate effectively in certain environments, such as underwater or underground, as they rely on fixed reference points.

A personal navigational apparatus that can operate without reference to a fixed reference point and can guide a person back to a safe position is therefore needed.

BRIEF SUMMARY OF THE INVENTION

According to an aspect of the present invention, there is provided personal navigation apparatus for providing output data to a person identifying a route back to a recorded waypoint position in accordance with claim 1.

According to a second aspect of the present invention, there is provided a method of providing output data to a person identifying a route back to a recorded waypoint position in accordance with claim 15.

DETAILED DESCRIPTION OF THE PREFERRED EMBODIMENTS

FIG. 1

Figure 1:
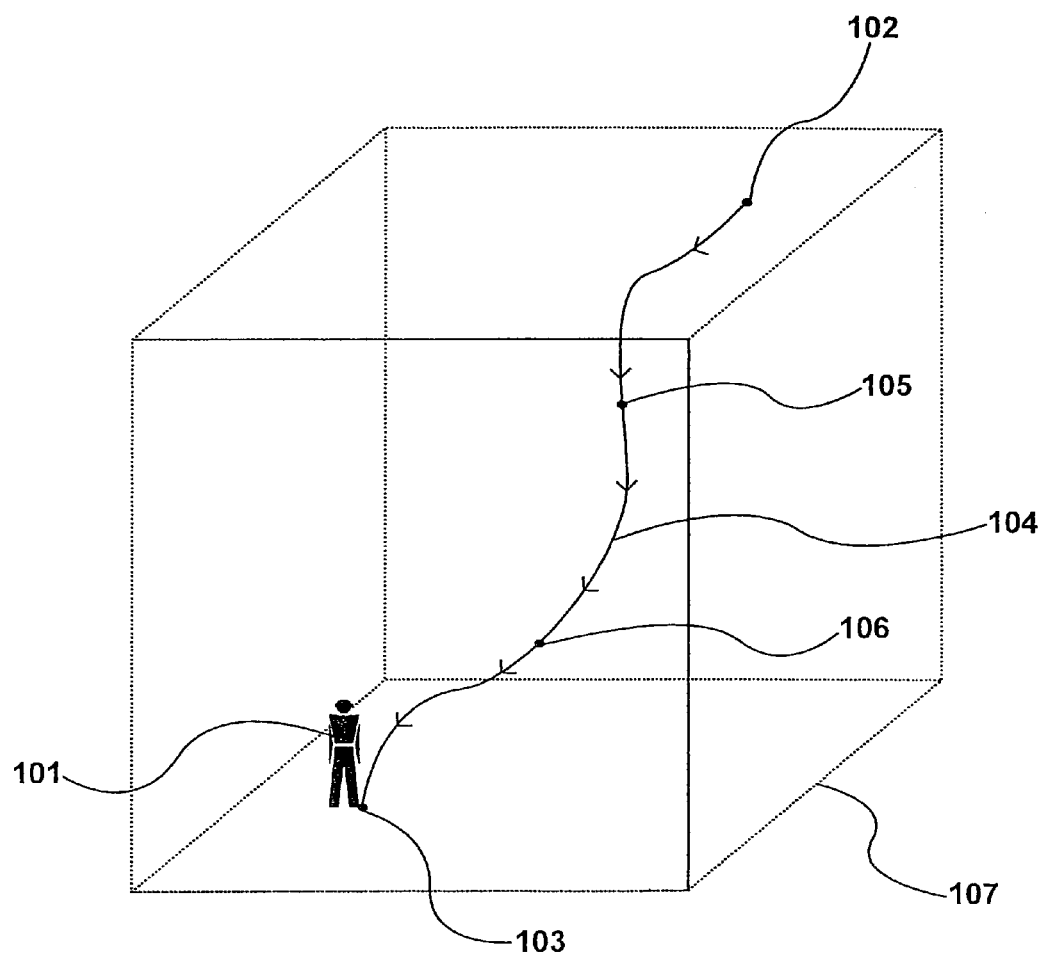
FIG. 1 shows a person requiring guiding back to a waypoint position through which they have travelled.

FIG. 1 shows a person 101 requiring guiding back to a waypoint position through which they have travelled. Person 101 has travelled from a start position 102 and has reached position 103, along the route indicated at 104. During their journey, person 101 has passed through waypoint 105 and subsequent waypoint 106, and hence these waypoints are recorded waypoints. A waypoint may indicate an arbitrary point along a route, however, a waypoint often indicates a point along a route at which a distinctive feature is present.

Positions along the route of person 101 are identifiable within a reference space 107, which in this example is a 3-dimensional reference space. A position is identifiable as an absolute position, for example enabling determination of a location within a reference space by use of a co-ordinate system, or as a relative position, for example enabling determination of a location with reference to another location within the reference space.

Person 101 may require guiding back to a waypoint position through which they have travelled as a result of an event. Such an event may be, for example, that the person begins to panic, that the person has become disoriented, or that the immediate environment is resulting in impairment of the senses or cognitive functions. When such an event occurs, it is desirable for that person to be able to retrace their path back to a recorded waypoint position at which the person may find relief from the causes of the event.

FIG. 2

Figure 2:
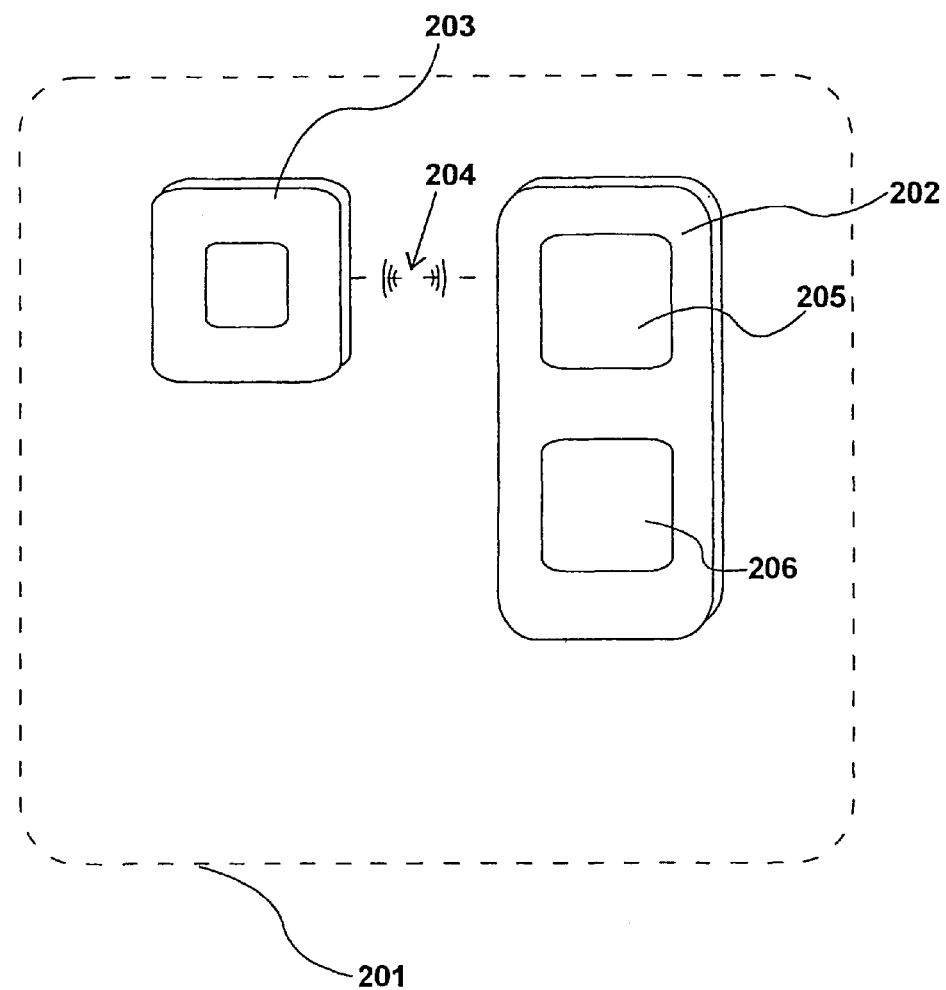
FIG. 2 shows portable rescue apparatus.

Personal navigation apparatus 201 for guiding a person back to a recorded waypoint position is shown in FIG. 2. Personal navigation apparatus 201 comprises a position device 202, a route indication device 203, and a communication interface, indicated at 204. Position device further comprises a first micromechanical device 205 and a second micromechanical device 206. In a preferred embodiment, the first micromechanical device 205 comprises a linear accelerometer. Preferably, said linear accelerometer includes a proof mass configured to be displaced from an equilibrium position under a linear acceleration. In a preferred embodiment, the second micromechanical device 206 is a vibrating structure gyroscope. Preferably, said vibrating structure gyroscope outputs a signal proportional to its angular rate of motion around an axis by measuring a Coriolis acceleration.

A gyroscope does not measure with respect to a fixed point, but rather with respect to an inertial reference space. A gyroscope is used to measure angular rate, or angular velocity, usually measured in degrees per second. Angular velocity may be measured around three orthogonal axes. The rotation around these axes is known as roll, pitch and yaw. There are numerous advantages of a gyroscope navigation system for aiding divers in the sub-sea environment. These advantages are based on the fact that gyroscopes are internally referenced. In contrast, a global positioning system (GPS) relies on an externally referenced method, involving electromagnetic wave-based communication between an orbiting satellite and the GPS receiver. Although GPS is a very accurate means of location above sea-level, a GPS system would not work for a receiver based less than a meter below the water level because electromagnetic waves are attenuated strongly in water.

Personal navigation apparatus 201 may be configured for use on land, underground or underwater or for use in either environment, allowing a user to pass from one into the other. As will be described in further detail below, the personal navigation apparatus 201 provides a rescue aid. When an event occurs, the rescue aid provides guidance to that person to encourage that person to return to a previous waypoint considered safer for that person. Unfortunately, in some situations an event may be potentially fatal. In some such situations, there is a relatively short duration in which to provide assistance to that person to improve their chances of survival.

FIG. 3

Figure 3:
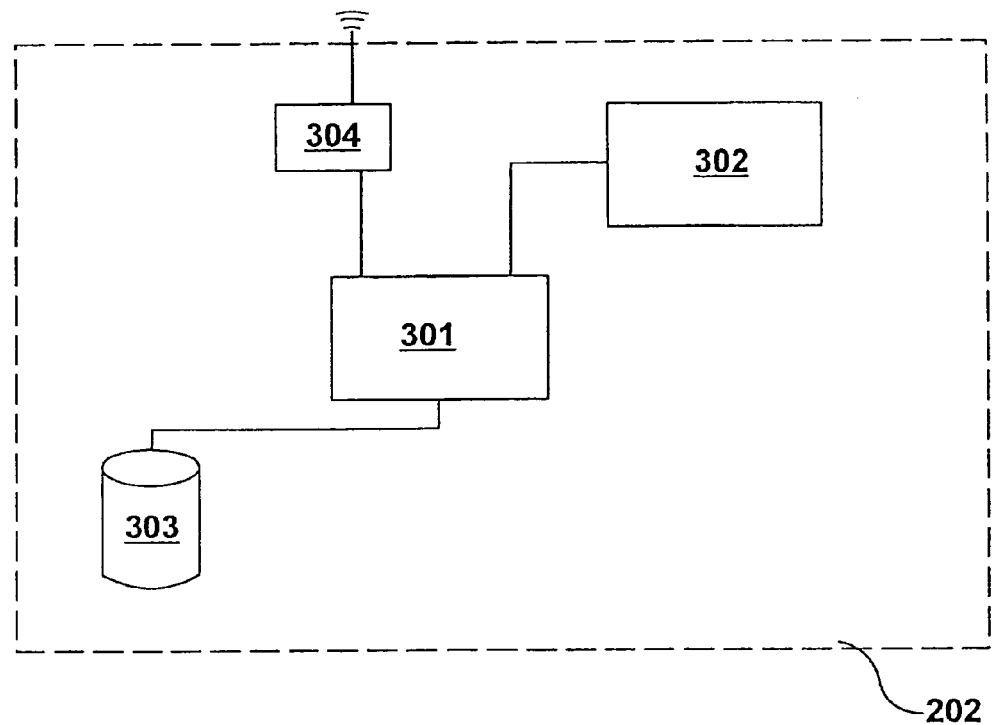
FIG. 3 shows schematic of a position device illustrated in FIG. 2.

A schematic showing components of a position device 202 is shown in FIG. 3. A processor 301 receives data from an inertial measurement device (IMD) 302. Position data based on data received from said IMD is generated, the position data indicating a position of the position device within a 3-dimensional reference space, and generated position data is stored in a data storage device 303. Position device 302 also comprises a communication interface 304. The position device may also comprise other components, for example a power supply. A power supply for the position device may be rechargeable or replaceable by the user.

Figure 4A:
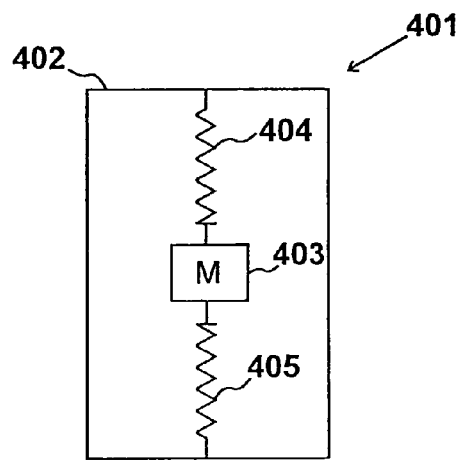
FIGS. 4A and 4B show a first micromechanical device.
Figure 4B:
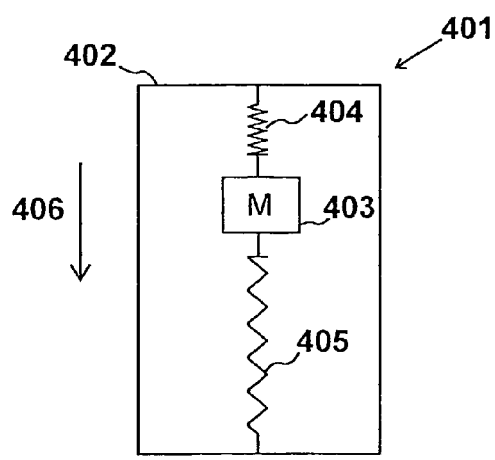

FIGS. 4A and 4B

As described above, in a preferred embodiment the first micromechanical device 205 is a linear accelerometer 401.

Linear accelerometer 401 is used in the personal navigation apparatus 201 for sensing linear acceleration along an axis. As described with reference to FIG. 2, three first micromechanical devices 205 are deployed. In combination, therefore, the personal navigation apparatus 201 provides detection of linear acceleration in three orthogonal axes within an inertial reference frame.

The principle of operation of the linear accelerometer 401 is shown in detail in FIGS. 4A and 4B. Referring to FIG. 4A, a casing 402 contains a proof mass 403 in an equilibrium position suspended from the casing 402 by a pair of springs 404 and 405. Referring to FIG. 4B, the linear accelerometer 401 is moved from rest in a direction indicated by arrow 406. The proof mass 403 has in turn been displaced from its equilibrium position in a direction opposite to that indicated by arrow 406. The displacement is proportional to the acceleration experienced.

The linear accelerometer 401 may possibly be fabricated on a silicon wafer, through which an electric current may be passed. As springs 404 and 405 compress and extend, the electrical characteristics of the silicon wafer vary in accordance with sensed acceleration. Output may be sensed capacitively by sensors (not shown) placed beneath the proof mass 403.

FIG. 5

As described above, in a preferred embodiment the second micromechanical device 206 is a vibrating structure gyroscope. A vibrating gyroscope is excited into vibration and the detection is that of certain vibration modes. The detection mechanism is based on the transfer of energy between two orthogonal vibrating modes when the device is rotating, that is, has a net angular velocity, known as the Coriolis effect. A preferred vibrating structure gyroscope is a tuning fork gyroscope. Alternative vibrating structure gyroscopes are possible, such as vibrating-wheel gyroscopes or wine glass resonator gyroscopes.

The tuning fork gyroscope 501 is used in the personal navigation apparatus 201 for sensing rotational motion around an axis. As described with reference to FIG. 2, three second micromechanical devices 206 are deployed. In combination, therefore, the personal navigation apparatus 201 provides detection of motion around three orthogonal axes within an inertial reference frame.

Figure 5:
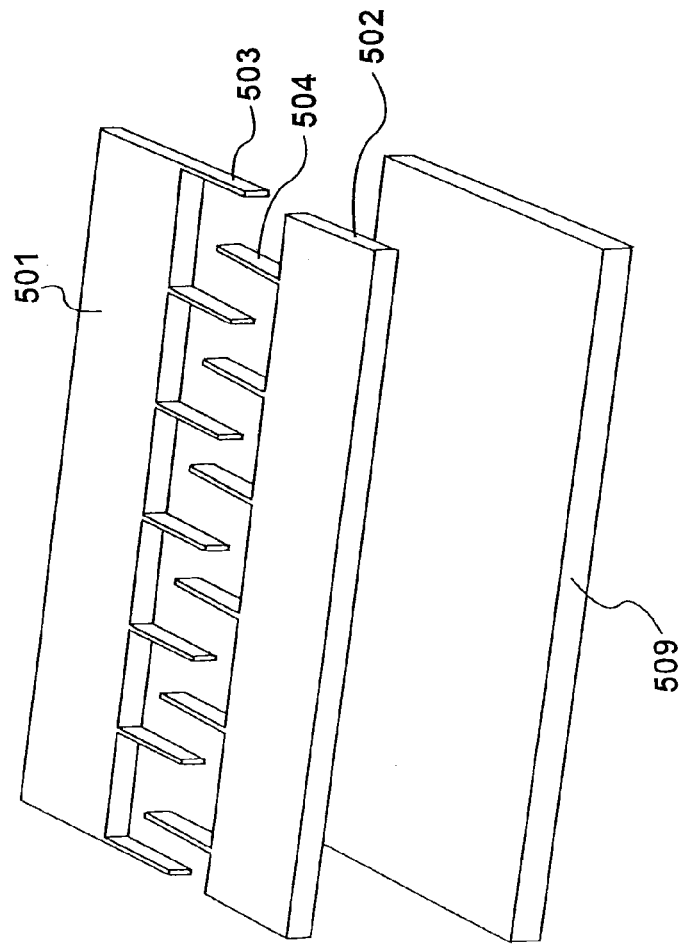
FIG. 5 shows a second micromechanical device.
Figure 5:
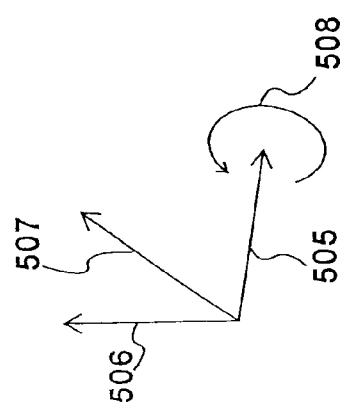

The principle of operation of tuning fork gyroscope 501 is shown in detail in FIG. 5. Tuning fork gyroscope 501 includes at least one pair of opposing structures 502 and 503. Structures 502 and 503 define substantially comb-like profiles 503 and 504 on each opposing face. The comb-like profiles 503 and 504 may be said to be made up of tines. The tines of comb-like profiles 503 and 504 interface such that comb-like profile 503 resides within comb-like profile 504.

Structures 502 and 503 are preferably fabricated from silicon or quartz. The structures 502 and 503 are driven by an electrical current such that structures 502 and 503 oscillate with equal amplitude but in opposite directions in axis 507. Thus, structures 502 and 503 are set in constant motion. On rotation around axis 505, indicated by arrow 508, a Coriolis acceleration causes one structure to move upwards in axis 506, and causes the other to move downwards in axis 506. A sensor 509 beneath the structures 502 and 503 senses the movement due to the Coriolis acceleration. The Coriolis acceleration is proportional in magnitude to the angular rate of motion around axis 505, and thus the output of sensor 509 is proportional in magnitude to the angular rate of motion around axis 505.

In the case where the structures 502 and 503 are fabricated from silicon, sensor 509 senses movement of structures of 502 and 503 capacitively. In the case where the structures 502 and 503 are fabricated from quartz, sensor 509 senses movement of structures of 502 and 503 piezoelectrically.

FIG. 6

Figure 6:
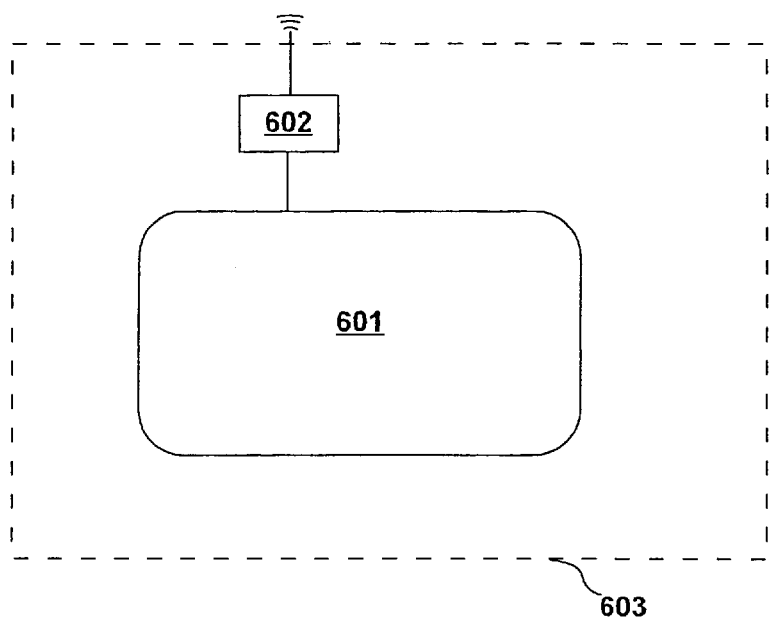
FIG. 6 shows a schematic of a route indication device illustrated in FIG. 2.

A schematic showing components of a route indication device 603 is shown in FIG. 6. A visual display element 601 presents a display based on data received via a communication interface 602. The route indication device may also comprise other components, for example a power supply. A power supply for the position device may be rechargeable or replaceable by the user.

FIG. 7

Figure 7:
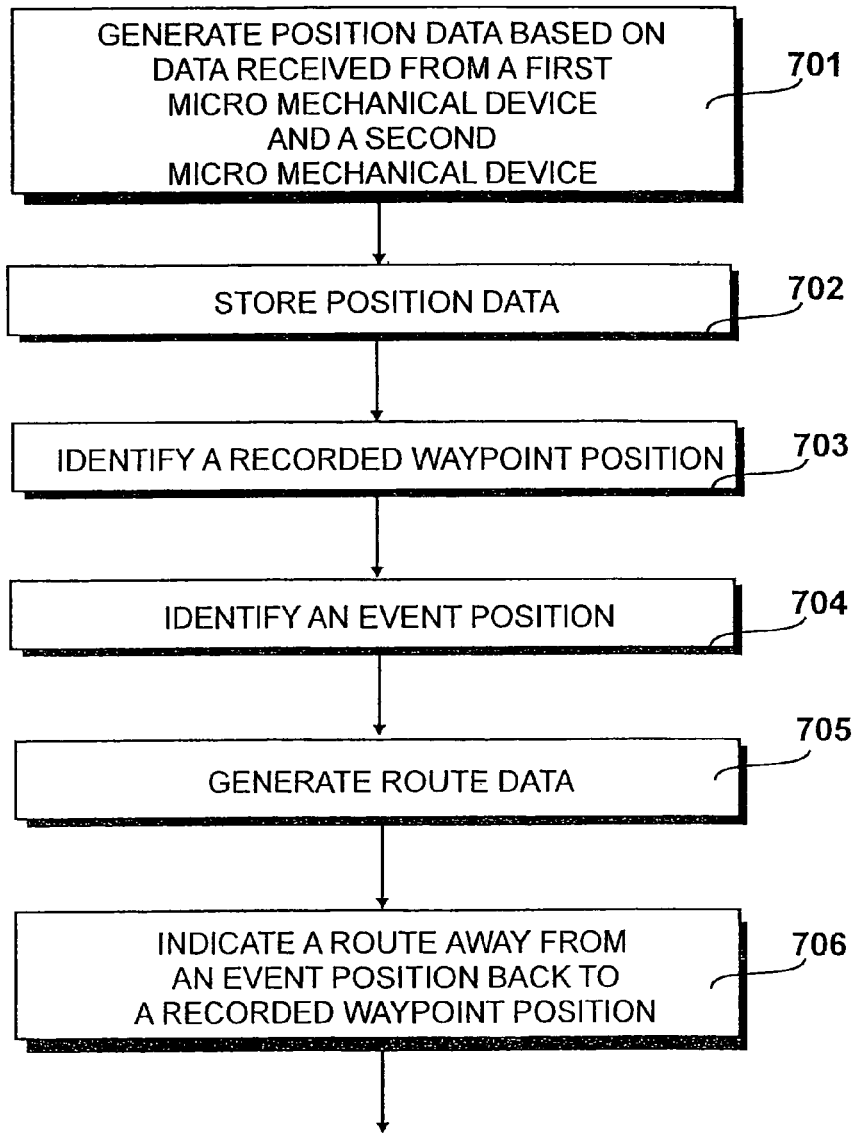
FIG. 7 shows illustrates the steps of a method of guiding a person back to a recorded waypoint position.

Steps in a method of guiding a person back to a recorded waypoint position are illustrated in FIG. 7. At step 701, position data is generated based on data received from the IMD. In an embodiment, the IMD comprises a first micromechanical device 205 and a second micromechanical device 206. In a preferred embodiment, the first micromechanical device 205 comprises a linear accelerometer. Preferably, said linear accelerometer includes a proof mass configured to be displaced from an equilibrium position under a linear acceleration. In a preferred embodiment, the second micromechanical device 206 is a vibrating structure gyroscope. Preferably, said vibrating structure gyroscope outputs a signal proportional to its angular rate of motion around an axis by measuring a Coriolis acceleration.

It is to be appreciated that the number, type and arrangement of components of the IMD may vary between applications. The IMD utilised in a particular application may be dependent upon cost, weight, or performance within a specific environment, for example.

Generated position data, indicating a position of said position device within a reference space, is stored in a data storage device at step 702. In an embodiment, generated position data is stored in chronological order so as to provide a history of the travel of a user of the rescue aid apparatus.

A recorded waypoint position is identified at step 703, and an event position is identified at step 704, the event position being a relative position relative to a stored position. An event position is a position from which a person is to be guided away from.

Route data relating to a route from an event position to a stored position is generated at step 705 and, at step 706, a route, based on said route data, to guide the person back to recorded waypoint position. It is to be appreciated that the factors on which a stored waypoint position is selected as the recorded waypoint position to which a person is to be guided back to may vary. For example, the recorded waypoint position to which a person is to be guided back to may be the last stored waypoint position.

In an embodiment, steps 701-705 are performed by a position device whilst step 706 is performed by a route indication device. Communication of data between the position device and the route indication device is effected by a wireless communication interface, for example by means of Bluetooth® communication, however, a wired communication connection may be used.

FIG. 8

Figure 8:
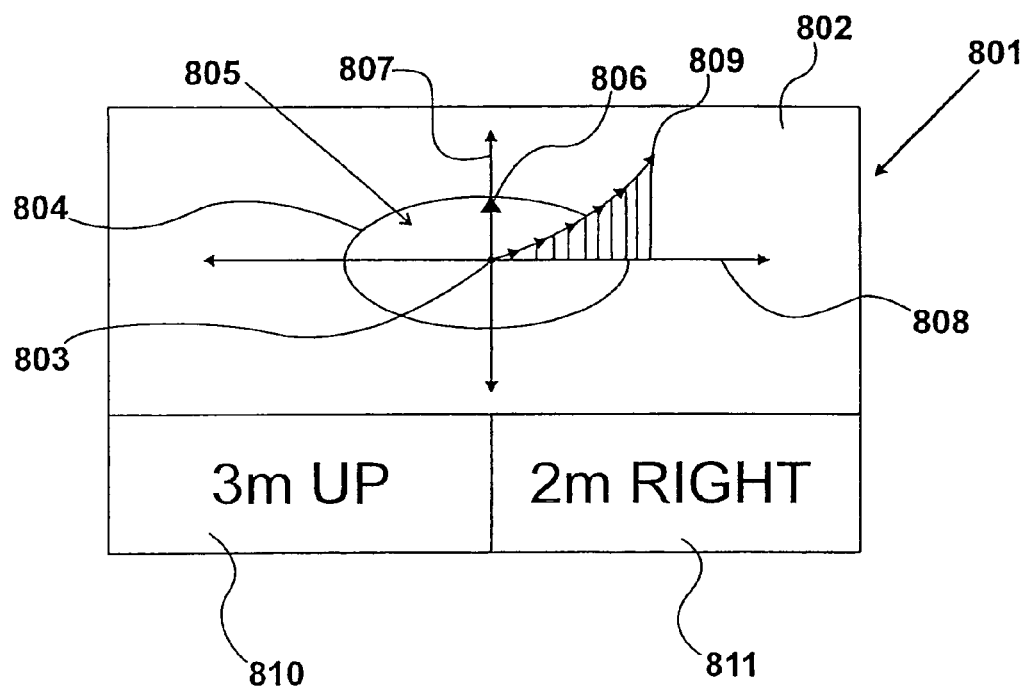
FIG. 8 shows an example of the features of a route indication display.

Example features of a route indication display are illustrated in FIG. 8. A route indication display 801 may comprise one or more indication zones. An indication zone may present a graphical display, a contrast display, an alphanumeric display or a combination of any types of display.

Indication zone 802 presents a graphical display. The graphical display shows an origin 803, about which a shape 804 extends to indicate a plane 805 on which a symbol 806 indicates the direction of sight when looking directly forward. A first axis 807, extending in a first direction through origin 803, indicates the upward and downward directions. A second axis 808, extending in a second direction through origin 803, indicates the left and right directions. A route cursor 809 for a person to follow is displayed. In this example, the route cursor 809 has arrows along it to visually emphasise it.

Indication zone 810 provides a textual display, in this indicating a distance to be travelled in a direction indicated by first axis 807. Similarly, indication zone 811 provides a textual display, in this indicating a distance to be travelled in a direction indicated by second axis 808. Further indication zones may indicate other information relating to a route back to a waypoint, or information in a different format. A route indication display may utilise indications of features of the real environment.

In an embodiment, the route indication display is dynamically updated in order to provide continuing assistance to a person moving in response to the assistance provided by the route indication display.

It is to be appreciated that, from the perspective of a person being guided by the rescue aid apparatus, the person does need to know exactly where they are, or even exactly where they should head for, when a problem is detected. Instead, that person needs to know how to get back to somewhere they were before a problem was detected. By using relative positional data, the guidance information required to be presented to a user in order to provide assistance to the user is simplified.

FIG. 9

Figure 9:
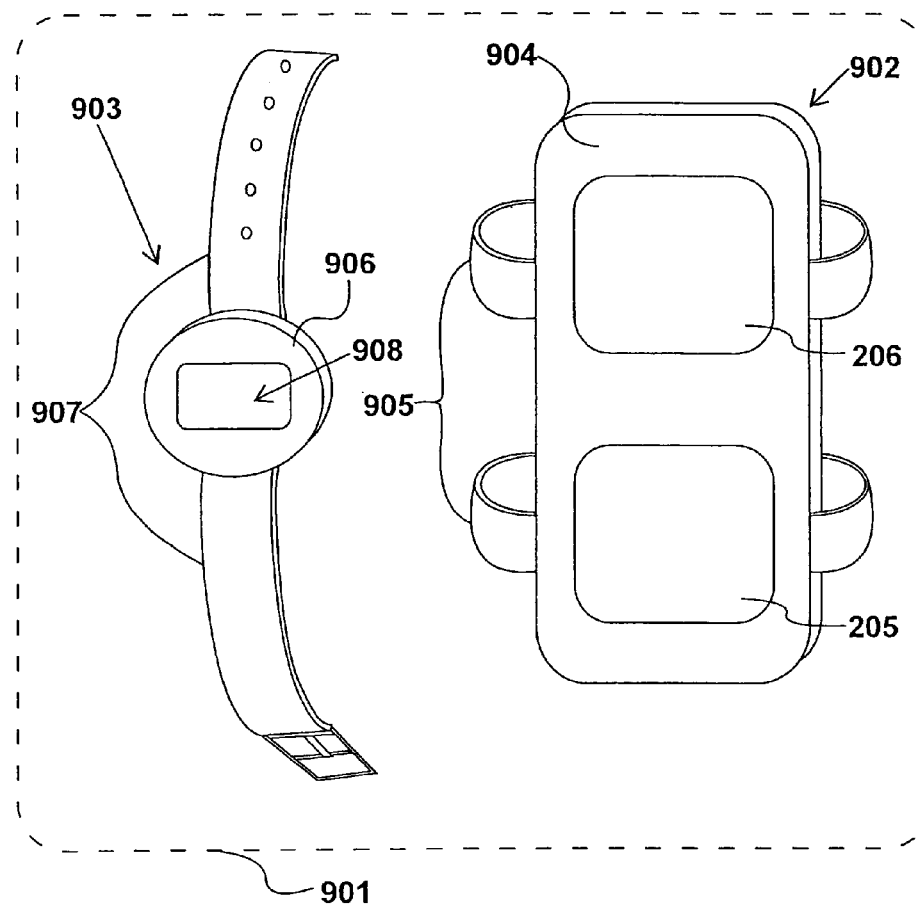
FIG. 9 shows portable rescue apparatus with additional application specific features.

FIG. 9 shows portable rescue apparatus 901 having the features of the personal navigation apparatus 201 and with additional application specific features. Portable rescue apparatus 901 comprises position device 902 and route indication device 903. Position device 902 comprises a first housing 904 and a first securing element 905. Similarly, route indication device 903 comprises a second housing 906 and a second securing element 907.

The first securing element 905 is configured to allow the position device 902 to be secured to an item configured to be secured to the body of the person. However, the arrangement of the first securing element 905 may vary between applications. The second securing element 907 is configured to allow the route indication device 906 to be secured to a wrist. However, the arrangement of the second securing element 907 may vary between applications. In this example, route indication device 906 resembles a watch, with a visual display element 908.

Apparatus 901 is configured to be submersible. Therefore housings 904, 905 of the position and route indication devices 902, 903 are impermeable.

In an embodiment, the apparatus 901 is configured to operate over a temperature range of at least −30 degrees Celsius to 50 degrees Celsius. In an embodiment, the apparatus 901 is configured to operate within a salinity range of at least 0 to 41 parts per thousand. In an embodiment, the apparatus 901 is configured to operate within a water flow up to 6 kilometers per hour and to a depth up to 300 m. In an embodiment, the apparatus 901 is configured to operate at sea level and at altitude. In an embodiment, the apparatus 901 is configured to operate for approximately 5 hours from fully charged.

FIG. 10

Figure 10:
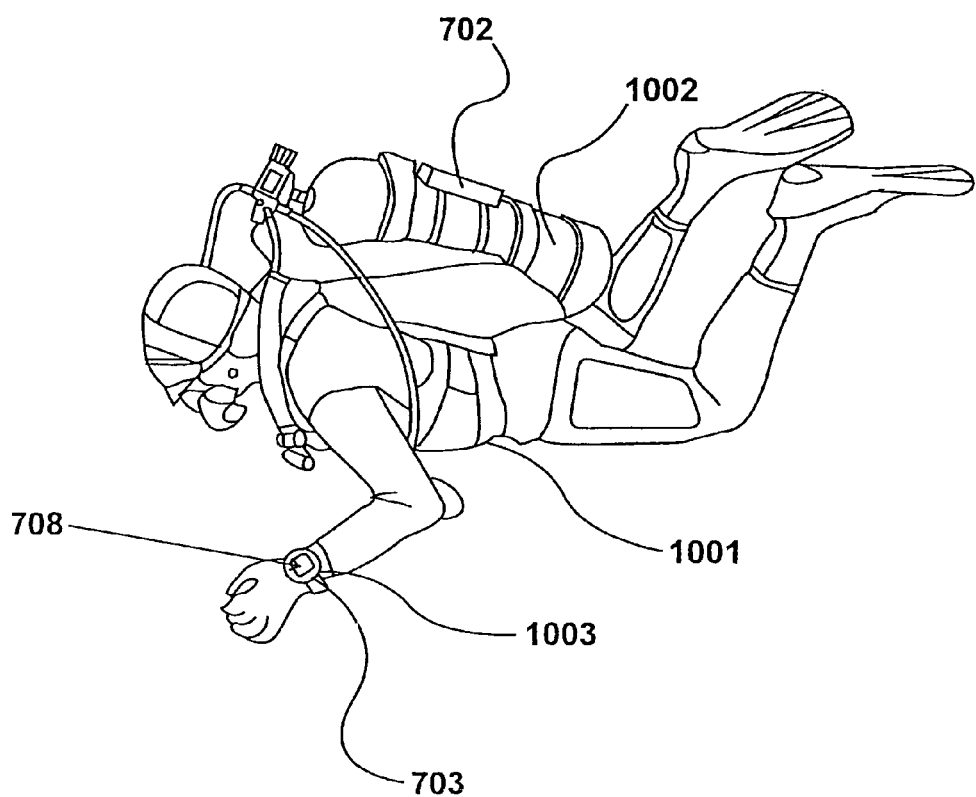
FIG. 10 shows the portable rescue apparatus of FIG. 9 in use by a diver.

FIG. 10 shows the portable rescue apparatus of FIG. 9 in use by a diver 1001, shown in an underwater environment. In an embodiment, the portable rescue apparatus further comprises a depth sensor. Position device 702 is strapped to a gas cylinder 1002 that in turn is mounted to the back of the diver 1001. This arrangement improves the steadiness to the position device relative to the overall movement of the diver 1001. Route indication device 703 is strapped to the wrist 1003 of the diver 1001. This arrangement allows the route indication device 703 to be brought closer to the eyes if required. Thus, the rescue apparatus is arranged to minimise any interference with natural movement when worn.

In an underwater environment, it is very easy for a person to become lost. The concentration of a diver is often divided between a variety of factors, such as safety, buoyancy, depth and air availability, for example, whilst in an environment that allows the diver to move in 3-dimensions that may present the diver with poor visibility, untraceable sounds and changing currents and terrain.

In an embodiment, the rescue aid apparatus is configured to output route data, in order to indicate a route to a recorded waypoint, in response to activation of a route indication routine. In an embodiment, the route indication device comprises a manually operable device configured to allow manual activation of the route indication routine. Thus, for example, route indication device 703 comprises an activation or 'panic' button that allows the diver to indicate that a problem has been detected in order to trigger the apparatus to present guidance back to a previous waypoint position. In an embodiment, the visual display element 708 comprises a touch screen. The touch screen may provide a route indication activation feature, alone or as part of a set of functions. It is to be understood that the visual display element should be dimensioned and illuminated as appropriate to improve visibility.

In an embodiment, the rescue aid comprises a manually operable device configured to allow manual designation of a waypoint. Again, the route indication device, for example, may comprise a designation button that allows the diver to indicate a waypoint position.

Alternatively or in addition to aforementioned functionality, a programme executed by the position device may store waypoints automatically in response to user preferences, for example based on duration intervals or distance intervals. Alternatively or in addition to aforementioned functionality, a programme executed by the position device may activation a route indication routine automatically in response to user preferences, for example based on a threshold distance from a designated waypoint position being exceeded.

FIG. 11

Figure 11:
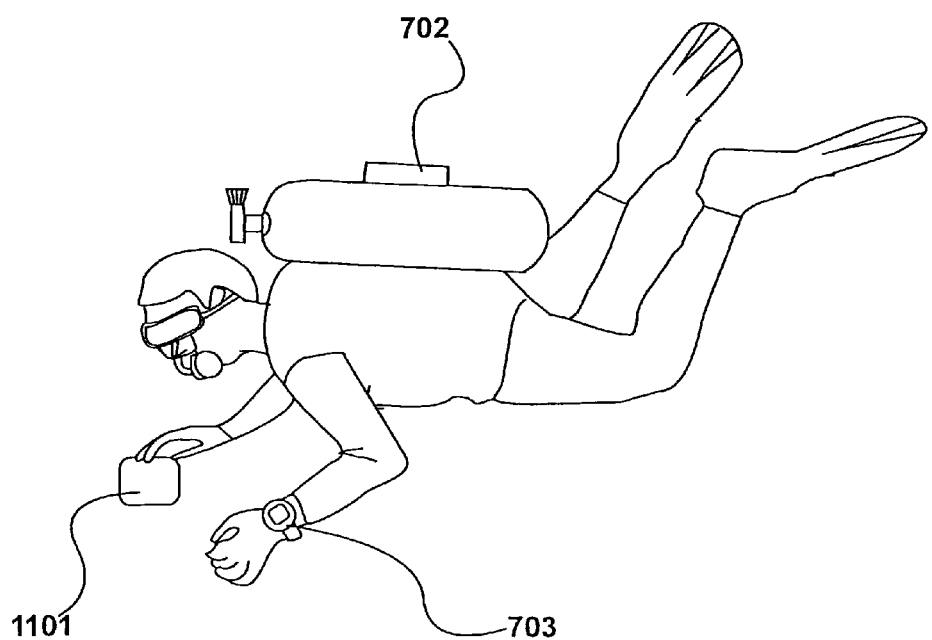
FIG. 11 shows a manually operable device configured to allow manual designation of a waypoint.

As shown in FIG. 11, a manually operable device configured to allow manual designation of a waypoint may take the form of a marker element to be deposited by a person at a selected position. Marker element 1101 comprises an RFID device.

FIG. 12

Figure 12:
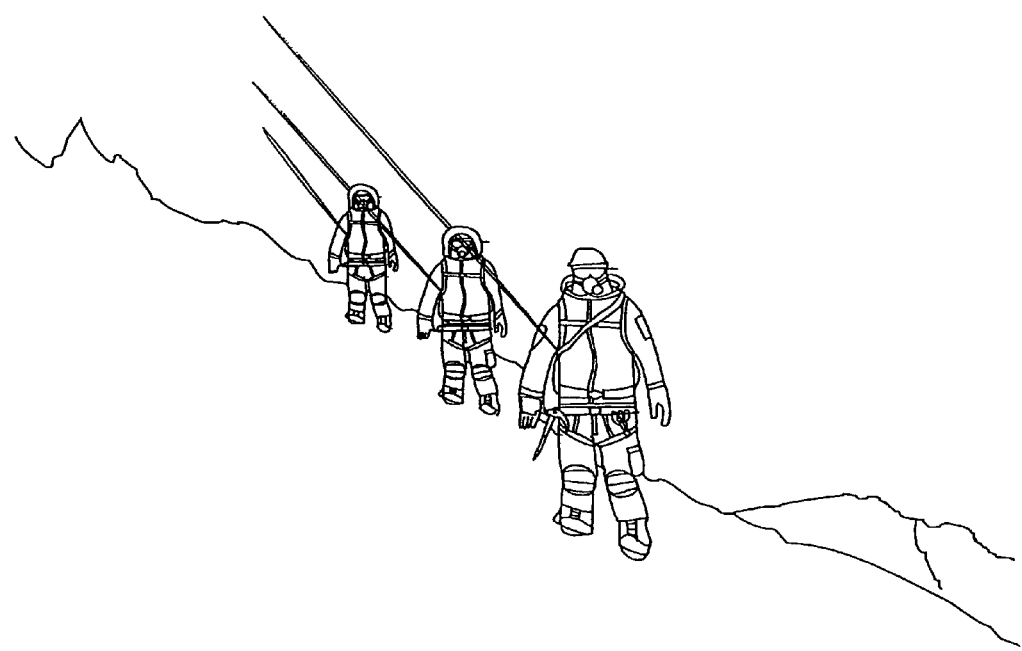
FIG. 12 shows a mountaineering scenario in which the portable rescue apparatus can assist.

FIG. 12 shows a mountaineering scenario. In such a situation, cloud cover may affect visibility and in such an event the portable rescue apparatus for guiding a mountaineer back to a recorded waypoint position by a mountaineer can assist.

FIG. 13

Figure 13:
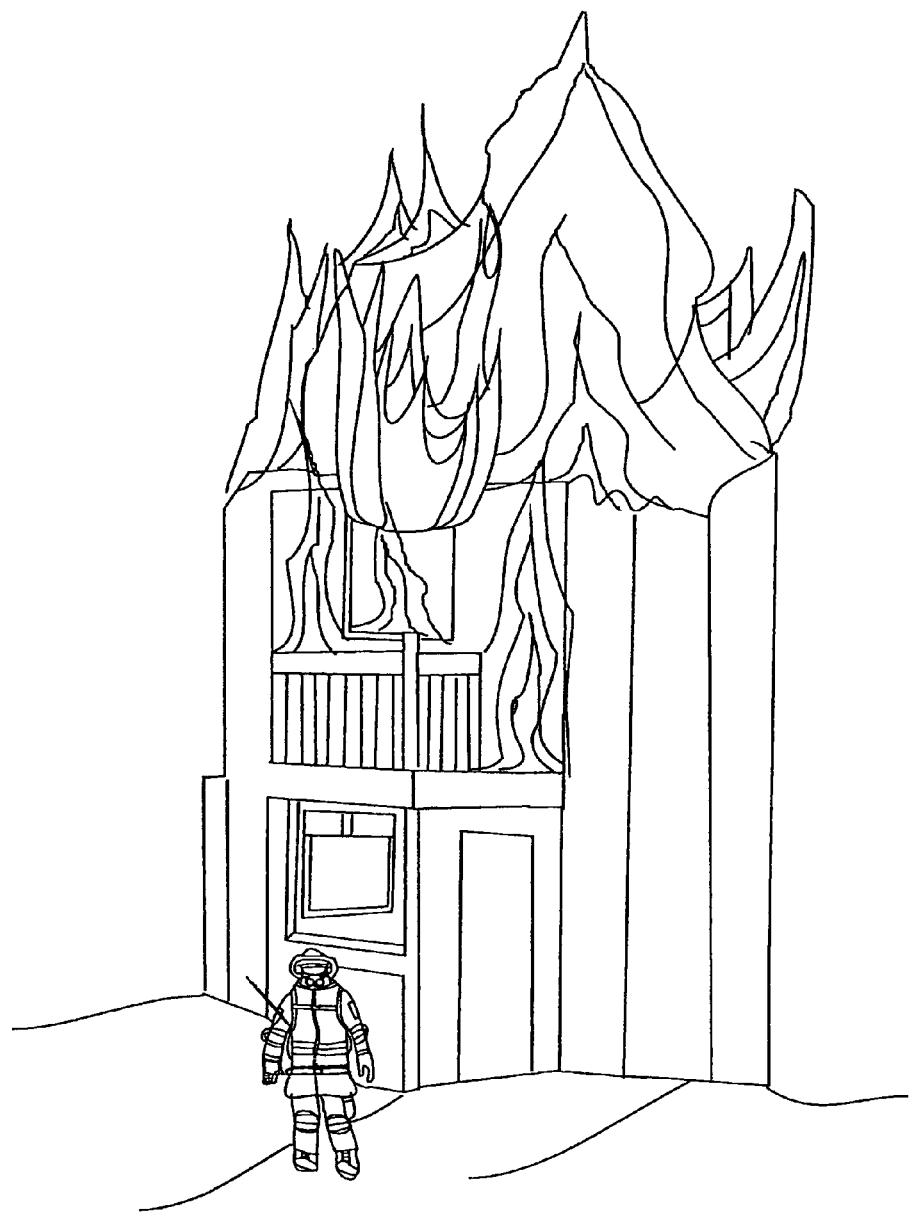
FIG. 13 shows an emergency scenario, in this example a fire has occurred in a building, in which the portable rescue apparatus can assist.

FIG. 13 shows an emergency scenario. In this example, a fire has started within a room of a building In such a situation, smoke may affect visibility and in such an event the portable rescue apparatus for guiding a rescue service operative back to a recorded waypoint position can assist. In this example, the target recorded waypoint position may be the door through which the rescue service operative entered the building.

FIG. 14

Figure 14:
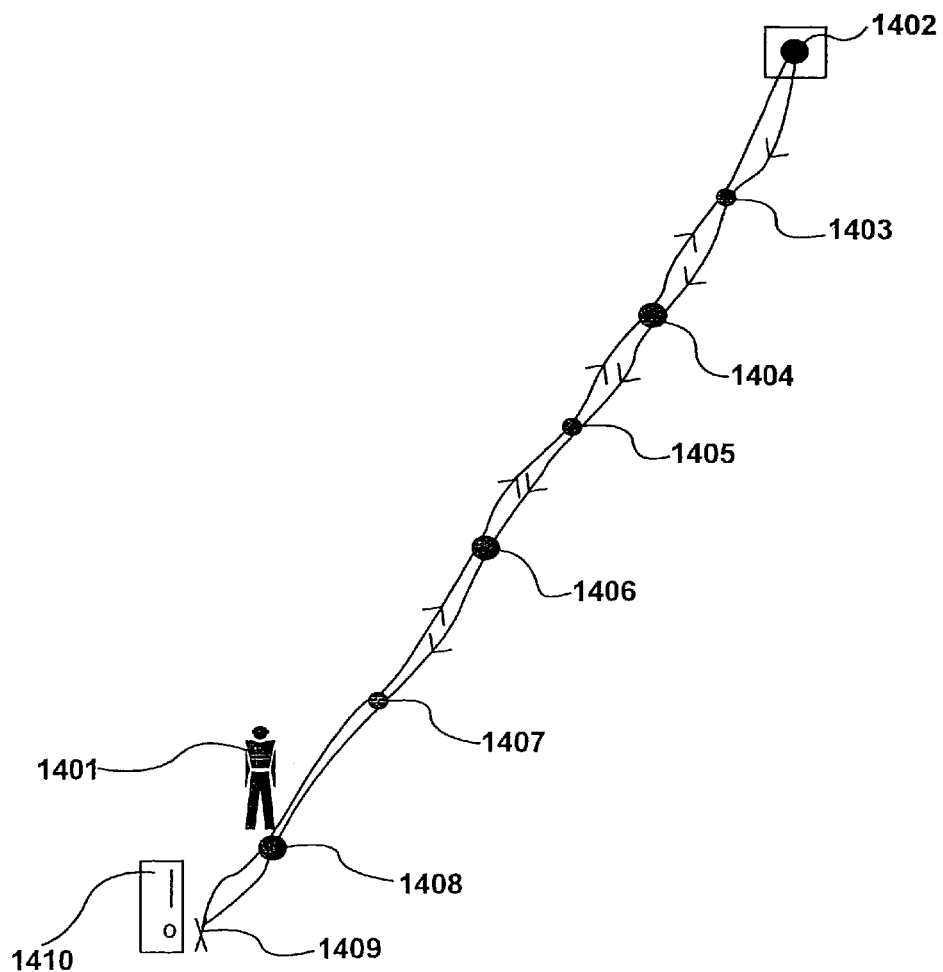
FIG. 14 shows a person requiring guiding back to a recorded waypoint position through which they have travelled.

FIG. 14 shows a person 1401 who has travelled from a position 1402. In this example, the exact location of the position 1402 is known, for example through use of a GPS device. Person 1401 has set out from position 1402 with the portable rescue apparatus for guiding a person back to a recorded waypoint position as described herein and in an operational mode as follows. On the outward journey, person 1401 reaches a waypoint 1403. The position device of the portable rescue apparatus stores a position that identifies waypoint 1403 relative to position 1402. Person 1401 then passes through waypoint 1403 and reaches waypoint 1404. The position device of the portable rescue apparatus stores a position that identifies waypoint 1404 relative to position 1403. Thus, at each waypoint, the position of that waypoint is identified with reference to the position of the previous waypoint. The setting of waypoint in this way effectively causes the position data generation to 'zero' the estimate of error. This process is then repeated through waypoints 1405, 1406, 1407 and 1408. Person 1401 then travels beyond waypoint 1408 to a position 1409. At this position, an event occurs, indicated at 1410, to the effect that person 1401 requires assistance to guide them back to a recorded waypoint. Position 1409 is identified as an event position, waypoint 1408 is identified as a recorded waypoint position and a route is indicated for person 1401 to follow. The indicated route directs person 1401 towards waypoint 1408. At waypoint 1408, person 1401 may resolve to continue back to position 1402. As person 1401 proceeds to travel the reciprocal journey back to position 1402, waypoints 1407 through 1403 are again encountered.

In an embodiment, the portable rescue apparatus is configured to allow the user to indicate that a waypoint has been reached, thereby contributing to a log of the course taken by a user during use of the rescue aid. In an embodiment, the portable rescue apparatus is configured to allow the user to indicate that they are embarking on a reciprocal journey. In an embodiment, the portable rescue apparatus is configured to allow the user to indicate that route indication may be terminated.

The invention claimed is:

1. Personal navigation apparatus for providing output data to a person identifying a route back to a starting position via a plurality of recorded waypoint positions, comprising:
 a route indication device including a visual display element; and
 a positioning device, including:
 a processor having a data storage device,
 a linear accelerometer configured to produce an output signal proportional to an acceleration along an axis, and
 a micromechanical vibrating structure gyroscope configured to produce an output signal proportional to its angular rate of motion around an axis;
 wherein said processor is configured to generate and store in said data storage device position data defining said recorded waypoint positions relative to said starting point within a reference space, based upon data received from said linear accelerometer and said vibrating structure gyroscope, wherein the position data for each recorded waypoint identifies only the route back to the previous recorded waypoint, so as to reduce measurement errors.

2. The personal navigation apparatus of claim 1, wherein said linear accelerometer includes a proof mass configured to be displaced from an equilibrium position under a linear acceleration.

3. The personal navigation apparatus of claim 1, wherein said vibrating structure gyroscope outputs a signal proportional to its angular rate of motion around an axis by measuring a Coriolis acceleration.

4. The personal navigation apparatus of claim 1, wherein said recorded waypoint positions are defined on activation of a recorded waypoint position routine in said processing system.

5. The personal navigation apparatus of claim 1, wherein said route indication device includes a manually operable device configured to allow activation of said recorded waypoint position routine in said processing system.

6. The personal navigation apparatus of claim 1, wherein said visual display element is configured to display said route back to said starting position via the recorded waypoint positions on activation of a route display routine in said processing system.

7. The personal navigation apparatus of claim 1, wherein said route indication device includes a manually operable device configured to allow activation of said route display routine.

8. The personal navigation apparatus of claim 1, wherein said route indication device and said position device each further comprise a communication interface configured to exchange data and instructions between said route indication device and said position device.

9. The personal navigation apparatus of claim 8, wherein said communication interface is a wireless communication interface.

10. The personal navigation apparatus of claim 1, wherein said apparatus is waterproof and configured to be submersible in water.

11. The personal navigation apparatus of claim 1, wherein said visual display element includes a touch screen.

12. The personal navigation apparatus of claim 10, further comprising a depth sensor.

13. A method of providing output data to a person identifying a route back to a starting position via a plurality of recorded waypoint positions, comprising the steps of:

generating position data describing the position of said personal navigation apparatus within a reference space, based upon data received from a micromechanical linear accelerometer and a micromechanical vibrating structure gyroscope, storing, in a data storage device, generated position data for said starting position and each of said recorded waypoint positions, wherein the position data for each recorded waypoint identifies only the route back to the previous recorded waypoint, so as to reduce measurement errors, identifying a recorded waypoint position, identifying an event position, said event position being a relative position relative to said starting position, and generating route data relating to a route from said event position to said starting position;

and visually indicating, on a route indication device, a route, based on said route data, identifying a route back to said starting position via said recorded waypoint positions.

14. The method of claim 13, wherein said generated position data is stored in chronological order.

15. The method of claim 13, wherein identifying a recorded waypoint position comprises selecting the last stored recorded waypoint position.

16. The method of claim 13, further comprising the step of transmitting said generated route data from said data storage device to said route indication device via a communication interface.

17. The method of claim 13, wherein the step of visually indicating a route further comprises displaying an arrow on said route indication device identifying the direction in which a person must travel.

18. The method of claim 13, wherein the step of visually indicating a route further comprises displaying a distance to be travelled back to a recorded waypoint position.

\* \* \* \* \*